United States Patent
Shastri et al.

(10) Patent No.: US 7,483,597 B2
(45) Date of Patent: Jan. 27, 2009

(54) OPTICAL MODULATOR UTILIZING MULTI-LEVEL SIGNALING

(75) Inventors: Kalpendu Shastri, Allentown, PA (US);
Bipin Dama, Bridgewater, NJ (US)

(73) Assignee: Lightwire, Inc., Allentown, PA (US)

( * ) Notice: Subject to any disclaimer, the term of this patent is extended or adjusted under 35 U.S.C. 154(b) by 0 days.

(21) Appl. No.: 11/975,050

(22) Filed: Oct. 17, 2007

(65) Prior Publication Data

US 2008/0095486 A1 Apr. 24, 2008

Related U.S. Application Data

(60) Provisional application No. 60/852,757, filed on Oct. 19, 2006.

(51) Int. Cl.
*G02F 1/00* (2006.01)
*G02F 1/01* (2006.01)
*G02F 1/03* (2006.01)
*G02F 1/035* (2006.01)
*G02B 26/00* (2006.01)

(52) U.S. Cl. ............ 385/3; 385/1; 385/2; 359/237; 359/238; 359/240; 359/245; 359/279

(58) Field of Classification Search .......... 385/1–3; 359/238, 240, 245, 279
See application file for complete search history.

(56) References Cited

U.S. PATENT DOCUMENTS

| | | | |
|---|---|---|---|
| 4,947,483 A | 8/1990 | Dirr | |
| 4,997,246 A | 3/1991 | May et al. | |
| 5,778,113 A | 7/1998 | Yu | |
| 6,592,274 B2 | 7/2003 | Kahn et al. | |
| 6,781,741 B2 | 8/2004 | Uesaka | |
| 7,146,109 B2 | 12/2006 | Chen et al. | |
| 7,155,134 B2 | 12/2006 | Azadet | |
| 7,173,551 B2 | 2/2007 | Vrazel et al. | |
| 7,257,329 B2 | 8/2007 | Azadet et al. | |
| 7,260,155 B2 | 8/2007 | Stonick et al. | |
| 7,272,271 B2 | 9/2007 | Kaplan et al. | |
| 2004/0114208 A1 | 6/2004 | Balsamo et al. | |
| 2005/0238367 A1 | 10/2005 | Chen et al. | |

*Primary Examiner*—Frank G Font
*Assistant Examiner*—Erin D Chiem
(74) *Attorney, Agent, or Firm*—Wendy W. Koba

(57) ABSTRACT

An optical modulator is formed to include a plurality of separate electrodes disposed along one arm, the electrodes having different lengths and driven with different signals to provide for multi-level signaling (e.g., PAM-4 signaling). By using separate drivers to energize the different sections, the number of sections energized at a given point in time will define the net phase shift introduced to the optical signal. The total length of the combined modulator sections is associated with a π phase shift (180°). Each section is driven by either a digital "one" or "zero", so as to create the multi-level modulation. An essentially equal change in power between adjacent transmitted symbols is accomplished by properly adjusting the lengths of each individual section.

8 Claims, 3 Drawing Sheets

OPTICAL MODULATOR UTILIZING MULTI-LEVEL SIGNALING

CROSS-REFERENCE TO RELATED APPLICATION

This application claims the benefit of U.S. Application No. 60/852,757, filed Oct. 19, 2006.

TECHNICAL FIELD

The present invention is directed to an optical modulator and, more particularly, to an optical modulator including multiple sections of different lengths so as to transmit multiple data bits at a time, reducing the serial symbol rate.

BACKGROUND OF THE INVENTION

Optical transmission systems are generally based on one of two methods of modulation of an optical signal, either direct modulation or external modulation. In the first of these methods, a DC current is applied to a laser, with a modulation current superimposed thereon, turning the laser "on" and "off". The disadvantage of this method is that when higher switching speeds are required, the dynamic behavior of the semiconductor material of the laser itself introduces distortion, primarily in the form of chirp. External modulation of an optical signal produces a modulated optical output signal with significantly reduced chirp, and external modulators have become preferred for high speed applications. In particular, electro-optic modulators such as Mach Zehnder interferometers (MZIs) are typically used for high speed applications.

For many years, external modulators have been made out of electro-optic material, such as lithium niobate. Optical waveguides are formed within the electro-optic material, with metal contact regions disposed on the surface of each waveguide arm. The application of a voltage to a metal contact will modify the refractive index of the waveguide region underneath the contact, thus changing the speed of propagation along the waveguide. By applying the voltage(s) that produce a π phase shift between the two arms, a nonlinear (digital) Mach-Zehnder modulator is formed. In particular, the optical signal is launched into the waveguide and the I/O electrical digital signal is applied to the contacts (using proper voltage levels, as mentioned above). The optical output is then "modulated" to create an optical I/O output signal. A similar result is possible with a linear (analog) optical output signal.

Although this type of external modulator has proven extremely useful, there is an increasing desire to form various optical components, subsystems and systems on silicon-based platforms. It is further desirable to integrate the various electronic components associated with such systems (for example, the input electrical data drive circuit for an electro-optic modulator) with the optical components on the same silicon substrate. Clearly, the use of lithium niobate-based optical devices in such a situation is not an option. Various other conventional electro-optic devices are similarly of a material (such as III-V compounds) that are not directly compatible with a silicon platform.

Recent advances have been made in the capability of forming optical devices, such as the modulator described above, within a silicon platform, based on free carrier modulation. In this configuration, the phase-shifting elements forming the modulator arms take the form of MOS capacitors formed along silicon waveguides. An applied voltage induces an accumulation of charges near the gate dielectric of the capacitor which, in turn, modifies the refractive index profile of the waveguide and ultimately the optical phase of the light passing through the waveguide. See, for example, U.S. Pat. Nos. 6,845,198 and 7,065,301, both assigned to the assignee of this application.

There is an increasing need for aggregating serial data and transmitting the aggregated data at a higher rate on a single fiber. The aggregation thus reduces the number of fibers required to carry the information, and also reduces (or even eliminates) the need for costly additional components such as multiplexers/demultiplexers. However, this aggregation results in increasing the data rate being transmitted over the fiber(s). In one typical arrangement, a set of four separate fibers are employed with each fiber transmitting data at a rate of 10 Gb/s. Alternatively, the data from all four fibers can be multiplexed onto a single fiber, thus transmitting data at a rate of 40 Gb/s. The inherent bandwidth limitation of the fiber associated with dispersion effects limits the distance an optical signal may propagate at this rate.

SUMMARY OF THE INVENTION

The need remaining in the art is addressed by the present invention which relates to an optical modulator and, more particularly, to an optical modulator including multiple sections of different lengths so as to transmit multiple data bits at a time, reducing the serial symbol rate.

In accordance with the present invention, the arms of an exemplary optical modulator are partitioned into a number of sections, the sections being of different lengths. Separate drivers are used to energize the different sections, where the number of sections energized at a given point in time will define the phase shift introduced to the optical signal. The total length of the combined modulator sections is associated with a π phase shift (180°). Each section is driven by either a digital "one" or "zero", so as to create the multi-level modulation.

It is an aspect of the present invention that inasmuch as the power equation is a cosine function of phase, an essentially equal change in power between adjacent transmitted symbols is accomplished by properly adjusting the lengths of each individual section. That is, in order to maintain essentially equal power values, the lengths of the section(s) near the steeper part of the cosine curve need to be smaller than the length of the sections along the flatter part of the curve.

A sectionalized modulator formed in accordance with the present invention may be configured so as to drive only one arm (single-ended) or both arms (differential).

Advantageously, the use of multiple electrodes of different lengths to perform multi-level signaling has been found to reduce the logic associated applying the various input signals to the multiple electrodes. Indeed, it has been found that the transmitted symbol rate can be twice as fast as transmitting the original data.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
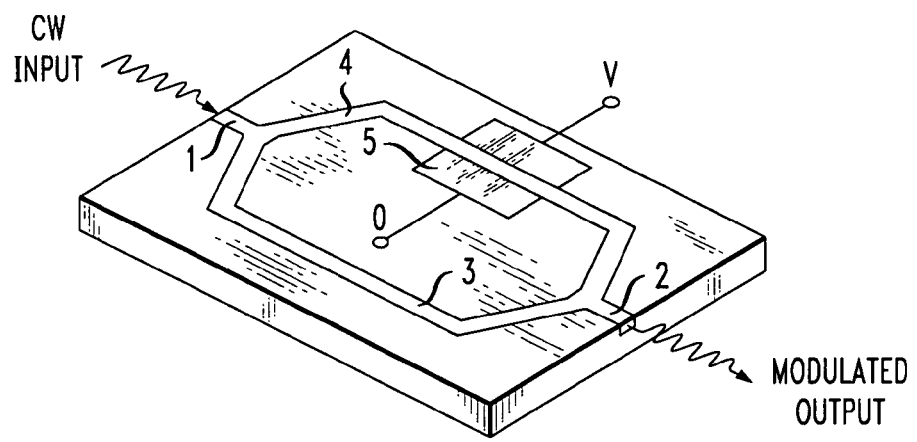
FIG. 1 illustrates a basic, prior art Mach-Zehnder interferometer-type modulator.

FIG. 1 illustrates an exemplary prior art Mach-Zehnder modulator that may be re-configured as described below to provide multi-level data transmission in accordance with the present invention. As shown, the prior art modulator comprises an input waveguide section 1 and an output waveguide section 2. A pair of waveguiding modulator arms 3 and 4 are shown and may be formed in one embodiment (i.e., an SOI-based embodiment) to include a capacitor-like structure.

In operation, an incoming continuous wave (CW) light signal from a laser source (not shown) is coupled into input waveguide section 1. The CW signal is thereafter split into a pair of waveguide arms 3 and 4. The application of an electrical drive signal to this modulator arm (or arms) will provide the desired phase shift to modulate the optical signal, forming a modulated optical output signal along output waveguide 2. A pair of electrodes 5 are illustrated in association with modulator arm 4 and used to provide the electrical drive signal to arm 4. A similar pair of electrodes may be associated with arm 3 to likewise introduce a delay onto the propagating optical signal. When operating in the digital domain, the electrodes may be turned "on" when desiring to transmit a logical "1" and then turned "off" to transmit a logical "0".

Figure 2:
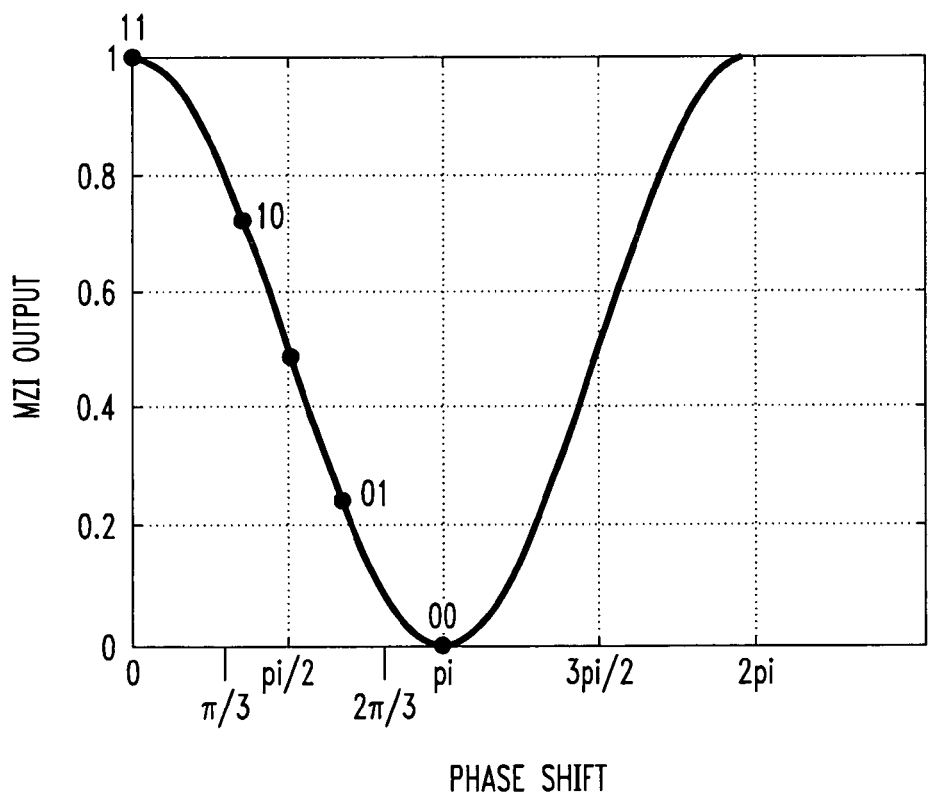
FIG. 2 is a plot of output power of an exemplary modulator.

To the first order, the output power of a conventional modulator as shown above is given by the equation:

$$P_{out} = P_0 * \frac{(1+\cos(\phi))}{2},$$

where $P_{out}$ is the output power from the modulator, $P_0$ is the nominal power, and $\phi$ is the net phase shift between the two arms (e.g., arms 3 and 4 of prior art FIG. 1). As a result, the optical output power level is controlled by changing the value of the net phase shift $\phi$ between the two arms. FIG. 2 is a plot of this relationship, illustrating the output power as a function of phase shift between the two arms (a "1" output associated with maximum output power $P_{out}$, and a "0" output associated with minimum output power $P_{out}$). That is, a differential phase shift between the two arms of the modulator provides either constructive interference (e.g., "1") or destructive interference (e.g., "0"). Although not shown or described, it is to be understood that in implementation such a modulator may utilize a DC section to optically balance the arms and set the operating point at a desired location along the transfer curve shown in FIG. 2.

In accordance with the present invention, multi-level signaling is provided by dividing at least one modulator arm into multiple sections of different lengths, with the total length being equal to one $\pi$ phase shift. Each separate section is driven with an digital logic "1" or a digital logic "0", that is, digitally driven to either be "on" or "off", creating the multi-level modulation.

It is a significant aspect of the present invention that each modulator section can be optimized in terms of nominal length to provide nearly equal power levels in absolute value, regardless of the position of the section along the modulator arm (i.e., its "position" relative to the cosine-based power curve). Referring again to FIG. 2, longer length modulation sections are needed to operate at the peak and valley of the cosine curve and provide the same output power change as sections associated with the "steeper", central area of the transfer curve.

Figure 3:
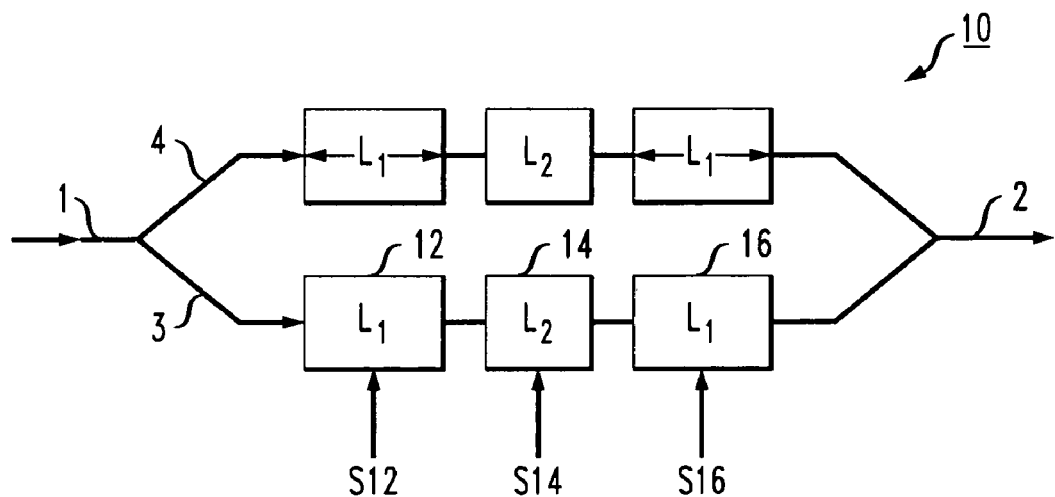
FIG. 3 illustrates an exemplary sectional modulator formed in accordance with the present invention to provide multi-level signaling.

FIG. 3 illustrates an exemplary optical modulator 10 formed in accordance with the present invention to provide multi-level signaling. Similar to the prior art modulator of FIG. 1, modulator 10 comprises an input waveguiding section 1 which is thereafter split to form the pair of waveguiding arms 3 and 4. The output optical signals along arms 3 and 4 are ultimately re-combined onto output waveguiding section 2. In accordance with this embodiment of the present invention, a plurality of separator modulator sections of different lengths are disposed along arm 3, where each section is controlled by a different input digital signal to generate the multi-level signaling. Referring to FIG. 3, first arm 3 is shown as including a first section 12 of a given length $L_1$, a second section 14 of length $L_2$ and a third section 16 of length $L_1$ (that is, third section 16 is formed to have essentially the same length as first section 12, for reasons as discussed below). The total length of $(2L_1+L_2)$ is determined to provide the total $\pi$ phase shift. A similar set of modulator sections may be formed along arm 4 and energized in concert with the sections along arm 3 in instances where differential modulation is utilized.

This particular configuration of the present invention is capable of transmitting a pulse amplitude modulated (i.e., PAM-4) signal. As mentioned above and shown in FIG. 2, the total output power is dependent upon the net phase shift $\phi$ between arms 3 and 4, which in turn depends on the total length of the modulator being driven. In the particular embodiment of FIG. 3, by controlling which of the three separate sections are driven, a set of four different logic values can be obtained, as shown in Table I below.

TABLE I

|  | Data to be transmitted | | | |
| --- | --- | --- | --- | --- |
|  | 00 | 01 | 10 | 11 |
| Section 12 | off | ON | ON | ON |
| Section 14 | off | off | ON | ON |
| Section 16 | off | off | off | ON |
| Net power level | 0 | $P_{out}/3$ | $2P_{out}/3$ | $P_{out}$ |

Therefore, when none of the three sections are driven, this event is associated with the event of a logic "00" being transmitted. When first section 12 is turned "on" and the remaining sections 14 and 16 remain turned "off", this is associated with the transmission of a logic "01". Turning "on" both the first and second sections 12 and 14 is associated with the transmission of a logic "10". Energizing all three sections is associated with the transmission of a logic "11".

Thus, in accordance with this embodiment of the present invention, two separate data bits are transmitted in each data cycle by controlling the on/off of the three segment pairs enables the transmission of both data bits. The capability of transmitting two data bits/cycle thus directly halves the transmission rate needed to send the same amount of information.

Inasmuch as sections 12 and 16 are the same length, it is possible to energize section 16 instead of section 12 to produce the same net phase shift. As a result, the signaling scheme in Table II may be used in place of that shown in Table I.

TABLE II

| | Data to be transmitted | | | |
|---|---|---|---|---|
| | 00 | 01 | 10 | 11 |
| Section 12 | off | off | ON | ON |
| Section 14 | off | off | ON | ON |
| Section 16 | off | ON | off | ON |
| Net power level | 0 | $P_{out}/3$ | $2P_{out}/3$ | $P_{out}$ |

This signaling arrangement allows for driving with a DC-balanced code, if the incoming data stream is also DC balanced (i.e., an essentially even distributions of 1's and 0's in the data stream). As shown in Table II, sections 12 and 14 are "off" for the transmission of "00" and "01" data and "on" for the transmission of the "10" and "11" data. As a result, the logic required to implement the arrangement using the coding scheme of Table II is minimal, operating at one-quarter and one-half the data rate to provide data transmission at the full data rate. That is, in order to transmit data at a rate of 40 Gb/s, the logic associated with Table II requires operation at only 10 Gb/s and 20 Gb/s.

Alternatively, the inputs required to generate a "01" output may be maintained as shown in Table I, and the inputs associated with a "10" transmission changed, in the manner shown in Table III, thus providing another DC-balanced configuration.

TABLE III

| | Data to be transmitted | | | |
|---|---|---|---|---|
| | 00 | 01 | 10 | 11 |
| Section 12 | off | ON | off | ON |
| Section 14 | off | off | ON | ON |
| Section 16 | off | off | ON | ON |
| Net power level | 0 | $P_{out}/3$ | $2P_{out}/3$ | $P_{out}$ |

As mentioned above, the use of multiple sections along a single modulator arm to provide multi-level signaling in accordance with the present invention allows for more than one data stream to be simultaneously transmitted over a single communication channel (such as, for example, over a single optical fiber). Table IV, below, illustrates the utilization of the arrangement of the present invention as shown in FIG. 3 to simultaneously transmit four separate "lanes" of data over a single channel.

TABLE IV

Digital Drive Signals Encoded Using Table I

| Input Data per Lane | | | | First Data Bit | | | Subsequent Data Bit | | |
|---|---|---|---|---|---|---|---|---|---|
| A | B | C | D | S12 | S14 | S16 | S12 | S14 | S16 |
| 0 | 0 | 0 | 0 | off | off | off | off | off | off |
| 1 | 0 | 0 | 0 | ON | off | off | off | off | off |
| 0 | 1 | 0 | 0 | ON | ON | off | off | off | off |
| 1 | 1 | 0 | 0 | ON | ON | ON | off | off | off |
| 0 | 0 | 1 | 0 | off | off | off | ON | off | off |
| 1 | 0 | 1 | 0 | ON | off | off | ON | off | off |
| 0 | 1 | 1 | 0 | ON | ON | off | ON | off | off |
| 1 | 1 | 1 | 0 | ON | ON | ON | ON | off | off |
| 0 | 0 | 0 | 1 | off | off | off | ON | ON | off |
| 1 | 0 | 0 | 1 | ON | off | off | ON | ON | off |

TABLE IV-continued

Digital Drive Signals Encoded Using Table I

| Input Data per Lane | | | | First Data Bit | | | Subsequent Data Bit | | |
|---|---|---|---|---|---|---|---|---|---|
| A | B | C | D | S12 | S14 | S16 | S12 | S14 | S16 |
| 0 | 1 | 0 | 1 | ON | ON | off | ON | ON | off |
| 1 | 1 | 0 | 1 | ON | ON | ON | ON | ON | off |
| 0 | 0 | 1 | 1 | off | off | off | ON | ON | ON |
| 1 | 0 | 1 | 1 | ON | off | off | ON | ON | ON |
| 0 | 1 | 1 | 1 | ON | ON | off | ON | ON | ON |
| 1 | 1 | 1 | 1 | ON | ON | ON | ON | ON | ON |

The four lanes (input data sources) are denoted A, B, C and D, where all possible combinations of data values for the four are shown. Table IV then also illustrates the drive states for various combinations of sections 12, 14 and 16 along arm 3. Utilizing the coding scheme of Table IV, PAM-4 modulation of four "lanes" of traffic can be transmitted using these drive states for the separate sections of the sectional modulator of the present invention. Advantageously, the ability to transmit this data over a single fiber allows for a halving of the transmission (in this example decreasing from 40 Gb/s to 20 Gb/s).

An additional savings, in terms of inputs to each section, can be derived using the logic scheme of Table II. A similar encoding scheme can also be implemented using Table III. In this case, the inputs to the various sections to follow the specific digital values of the data, as shown in Table V, below:

TABLE V

Digital Drive Signals encoded using Table II

| Input Data per Lane | | | | First Data Bit | | Subsequent Data Bit | |
|---|---|---|---|---|---|---|---|
| A | B | C | D | S12 | S14/S16 | S12 | S14/S16 |
| 0 | 0 | 0 | 0 | off | off | off | off |
| 1 | 0 | 0 | 0 | ON | off | off | off |
| 0 | 1 | 0 | 0 | off | ON | off | off |
| 1 | 1 | 0 | 0 | ON | ON | off | off |
| 0 | 0 | 1 | 0 | off | off | ON | off |
| 1 | 0 | 1 | 0 | ON | off | ON | off |
| 0 | 1 | 1 | 0 | off | ON | ON | off |
| 1 | 1 | 1 | 0 | ON | ON | ON | off |
| 0 | 0 | 0 | 1 | off | off | off | ON |
| 1 | 0 | 0 | 1 | ON | off | off | ON |
| 0 | 1 | 0 | 1 | off | ON | off | ON |
| 1 | 1 | 0 | 1 | ON | ON | off | ON |
| 0 | 0 | 1 | 1 | off | off | ON | ON |
| 1 | 0 | 1 | 1 | ON | off | ON | ON |
| 0 | 1 | 1 | 1 | off | ON | ON | ON |
| 1 | 1 | 1 | 1 | ON | ON | ON | ON |

Figure 4:
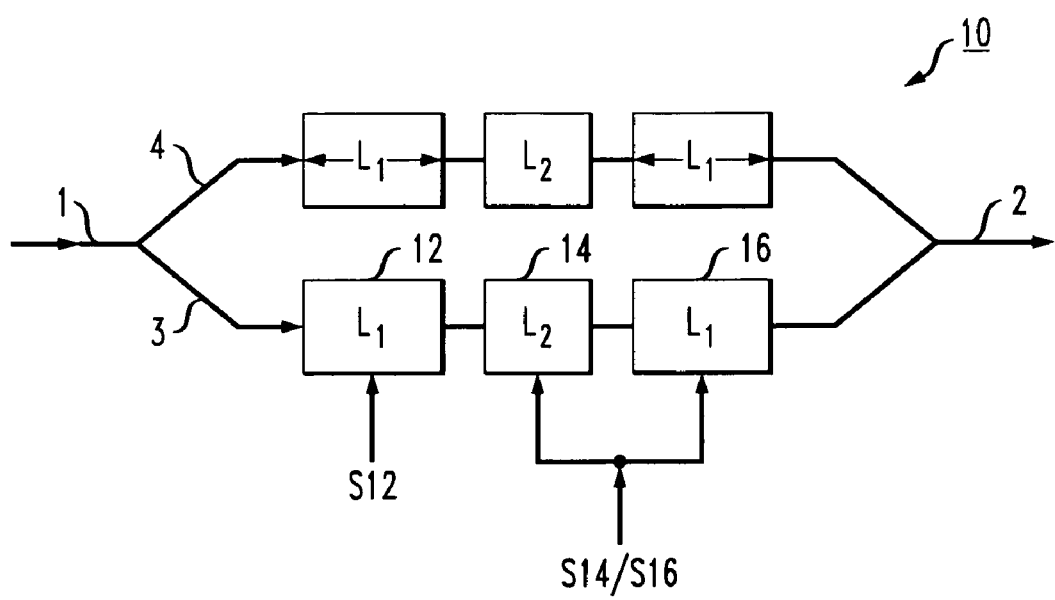
FIG. 4 shows one arrangement of the embodiment of FIG. 3, particularly configured to transmit data from four separate data sources.

Using the values from Table V, FIG. 4 illustrates an exemplary sectional modulator 100 formed in accordance with the present invention that is capable of transmitting four separate data sources (from A, B, C, D) as a single modulator output, at a speed only double that of the various data sources. That is, if each of source A, B, C and D is transmitting data at 10 Gb/s, the data from all four can be transmitted using the sectional, multi-level arrangement of the present invention at a rate of 20 Gb/s. Using the code scheme as shown in Table V and illustrated in FIG. 4, two sections may be driven using a common driver circuitry, simplifying the electronics implementation The ability to transmit this data at 20 Gb/s thus eliminates the various transmission problems associated with a straightforward multiplexing of the four streams to create a 40 Gb/s output data signal, where channel dispersion issues become problematic at speeds nearing 40 Gb/s.

It is a significant aspect of the present invention that the physical lengths of each section can be particularly configured to provide an essentially identical power change, denoted $\Delta P$, between each transmitted symbol. Thus, as mentioned above, in order to maintain an essentially equal power distribution, the sections along the portions of the cosine curve having a smaller rate of change need to be longer, and the sections along the "steeper" part of the curve need to be shorter.

Figure 5:
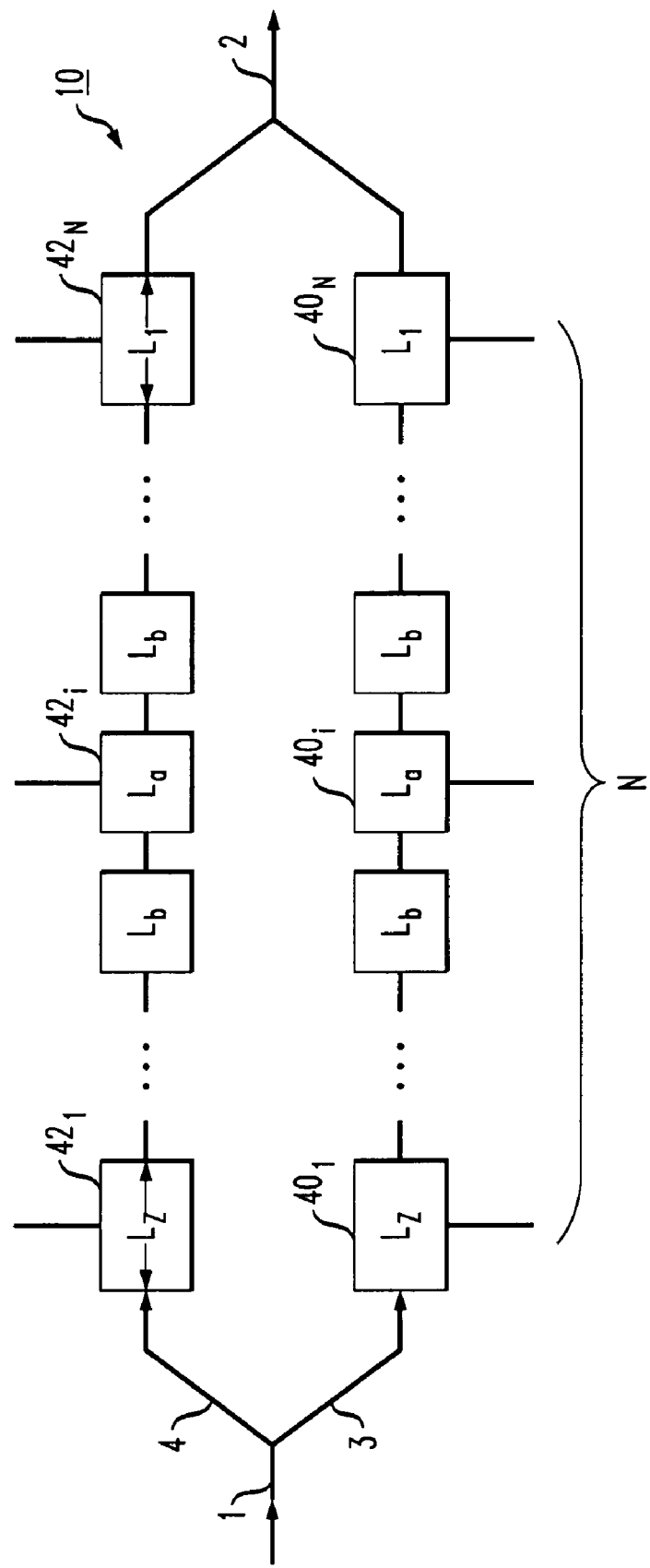
FIG. 5 is a generalized configuration of a sectional modulator formed in accordance with the present invention, illustrating in particular the different section lengths utilized to provide essentially equal power values for each transmission level.

In particular, the length of the sections is developed in the manner shown in FIG. 5, which illustrates a general architecture of a modulator formed in accordance with the present invention having a plurality of N sections formed along each modulator arm 3 and 4. Referring to FIG. 5, modulator arm 3 is illustrated as including a plurality of N sections $40_1$-$40_N$, where modulator sections $40_1$ and $40_N$, disposed at the opposing ends of the set are formed to have the longest length, shown here as $L_z$. In contrast, the centermost section, denoted $40_i$, is formed to have the shortest length (shown as $L_a$). The remaining sections (if any) are formed to exhibit an increasing length when moving in the direction outward from center section $40_i$.

In a similar manner, modulator arm 4 may be formed to comprises a plurality of modulator sections $42_1$-$42_N$, similarly formed and arranged as described above in association with modulator arm 3 when used in a differential signaling arrangement. The expansion into a greater number of sections allows for PAM-n based data (as well as other types of multi-level signaling) to be implemented.

What is claimed is:

1. An optical modulator for creating a multi-level data signaling output, the modulator comprising
    an input waveguiding section for receiving a continuous wave (CW) optical input signal;
    an input optical splitter, coupled to the output of the input waveguiding section for dividing the CW optical input signal into a pair of CW optical input signals;
    a pair of optical waveguides coupled to the outputs of the input optical splitter, the pair of optical waveguides forming a pair of modulator arms for supporting the propagation of the optical signal, at least one modulator arm partitioned into a plurality of N modulator sections, each section being of a predetermined length such that the combination of the lengths of the plurality of N modulator sections equal to providing a complete $\pi$ phase shift to the continuous wave optical input signal propagating therealong;
    a plurality of N digital drivers, each driver coupled to a separate modulator section of the plurality of N modulator sections, the combination of digital inputs to the plurality of N digital drivers determined in association with the multi-level output data signal to be delivered by the modulator, the "on" or "off" state of each modulator section contributing to the phase shift between the input and output signals;
    an output optical combiner for combining the pair of modulated optical signals into a modulated optical output signal; and
    an output waveguiding section coupled to the output of the output optical combiner for supporting the propagation of the modulated optical output signal.

2. An optical modulator as defined in claim 1 wherein the predetermined lengths of each modulator section are configured to provide an essentially equal power value for each output signal level.

3. An optical modulator as defined in claim 1 and configured to provide PAM-4 multi-level signaling, wherein the plurality of N modulator sections comprises three sections: a first section of length $L_1$, a second section of length $L_2$ and a third section of length $L_1$, where the combination ($2L_1+L_2$) provides a $\pi$ phase shift from the input to the output of the modulator.

4. An optical modulator as defined in claim 3 wherein a DC-balanced encoding scheme is utilized such that the digital drivers associated with the second and third modulator sections are coupled together to receive the same data input signal.

5. An optical modulator as defined in claim 3 wherein a DC-balanced encoding scheme is utilized such that the digital drivers associated with the first and second modulator sections are coupled together to receive the same data input signal.

6. An optical modulator as defined in claim 1 wherein a single modulator arm is formed to include a plurality of sections of different lengths.

7. An optical modulator as defined in claim 1 wherein the modulator utilizes differential input signals and both modulator arms are formed to include a plurality of sections of different lengths, wherein the sections on each arm are matched in terms of location and length.

8. An optical modulator as defined in claim 1 wherein the optical modulator comprises an SOI-based optical modulator.

* * * * *